United States Patent
Martin et al.

(10) Patent No.: US 6,894,536 B2
(45) Date of Patent: May 17, 2005

(54) LOW POWER NRZ INTERCONNECT FOR PULSED SIGNALING

(75) Inventors: Aaron K. Martin, Hillsboro, OR (US); Bryan K. Casper, Hillsboro, OR (US); Shekhar Y. Borkar, Beaverton, OR (US); Stephen R. Mooney, Beaverton, OR (US); Joseph T. Kennedy, Beaverton, OR (US); Matthew B. Haycock, Beaverton, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/013,165

(22) Filed: Dec. 10, 2001

(65) Prior Publication Data

US 2003/0107411 A1 Jun. 12, 2003

(51) Int. Cl.[7] .......................................... H03K 19/0175
(52) U.S. Cl. ............................................ 326/63; 326/86
(58) Field of Search ........................ 326/21, 30, 17, 326/63, 71, 73, 82, 83, 86, 68, 81; 341/60, 68, 69; 327/389, 180, 333; 330/259, 260, 258

(56) References Cited

U.S. PATENT DOCUMENTS

| | | | | |
|---|---|---|---|---|
| 4,764,759 A | * | 8/1988 | Braun et al. | 340/653 |
| 5,204,880 A | * | 4/1993 | Wurster et al. | 375/258 |
| 5,539,333 A | * | 7/1996 | Cao et al. | 326/63 |
| 5,778,204 A | * | 7/1998 | Van Brunt et al. | 710/305 |
| 5,781,028 A | * | 7/1998 | Decuir | 326/30 |
| 5,959,492 A | * | 9/1999 | Khoury et al. | 327/389 |
| 6,025,742 A | * | 2/2000 | Chan | 327/108 |
| 6,034,551 A | * | 3/2000 | Bridgewater, Jr. | 326/82 |

* cited by examiner

*Primary Examiner*—Michael Tokar
*Assistant Examiner*—Linh Von Nguyen
(74) *Attorney, Agent, or Firm*—Schwegman, Lundberg, Woessner & Kluth, P.A.

(57) ABSTRACT

A digital interconnect system transmits pulses across a differential transmission line in response to transitions in an input data signal.

12 Claims, 7 Drawing Sheets

LOW POWER NRZ INTERCONNECT FOR PULSED SIGNALING

FIELD OF THE INVENTION

The invention relates generally to signaling and, more particularly, to structures and techniques for performing pulsed signaling within a digital system.

BACKGROUND OF THE INVENTION

Digital interconnects are used in a wide variety of systems to transfer digital information between devices. Many of these interconnects utilize a binary non-return-to-zero (NRZ) signaling scheme to transfer data. The binary NRZ scheme represents a "logic one" using a positive voltage level and a "logic zero" using a negative voltage level (or vice versa). A driver in an interconnect using such a signaling scheme will consume power continuously, even during periods of little or no data activity. As is well known, it is generally desirable to reduce power consumption within a digital system when possible. Therefore, there is a need for lower power digital interconnect solutions.

DETAILED DESCRIPTION

Figure 1:
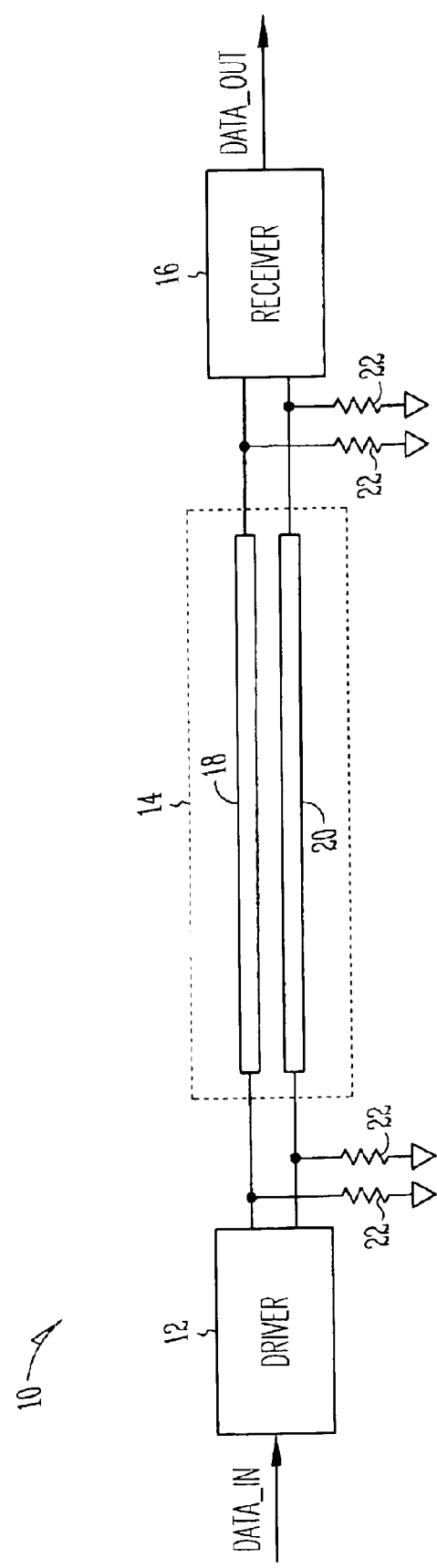
FIG. 1 is a block diagram illustrating an interconnect system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a digital interconnect system and method that is capable of low power operation. Pulses are transmitted across a differential transmission line in response to transitions within an input data signal. The pulses are sensed at an opposite end of the transmission line and the original data signal is reconstructed by performing an appropriate data conversion. Either current or voltage pulses can be transmitted. The power consumed by the interconnect system will depend upon the level of data switching activity at the input of the system. Thus, during periods of low switching activity (e.g., long strings of zeros or ones) very little power is consumed by the interconnect. The principles of the present invention may be used in any digital system that may benefit from low power transfer of digital information.

FIG. 1 is a block diagram illustrating an interconnect system 10 in accordance with an embodiment of the present invention. The interconnect system 10 may be used, for example, to transmit digital data from a first device to a second device within a digital system. To provide two-way communication, another interconnect system 10 may be used to transmit digital data from the second device to the first device. As illustrated, the interconnect system 10 includes: a driver 12, a differential transmission line 14, and a receiver 16. The driver 12 receives a data signal (DATA_IN) at an input thereof. The driver 12 then uses the data signal to generate a transmit signal that is representative of the input data. The transmit signal is transmitted through the differential transmission line 14 and is sensed by the receiver 16 at the other end of the line 14. The receiver 16 then generates an output data signal (DATA_OUT) based on the sensed signal. The output data signal of the receiver 16 is typically a replica of the input data signal of the driver 12. As shown, the differential transmission line 14 includes first and second signal conductors 18, 20. In addition, the differential transmission line 14 is terminated at both ends using optional terminations 22 that may be matched to the characteristic impedance of the line 14. The differential transmission line 14 may be implemented in a variety of different ways including, for example, wires, twisted pair, cable, coaxial cable, microstrip, stripline, and/or others.

Figure 2:
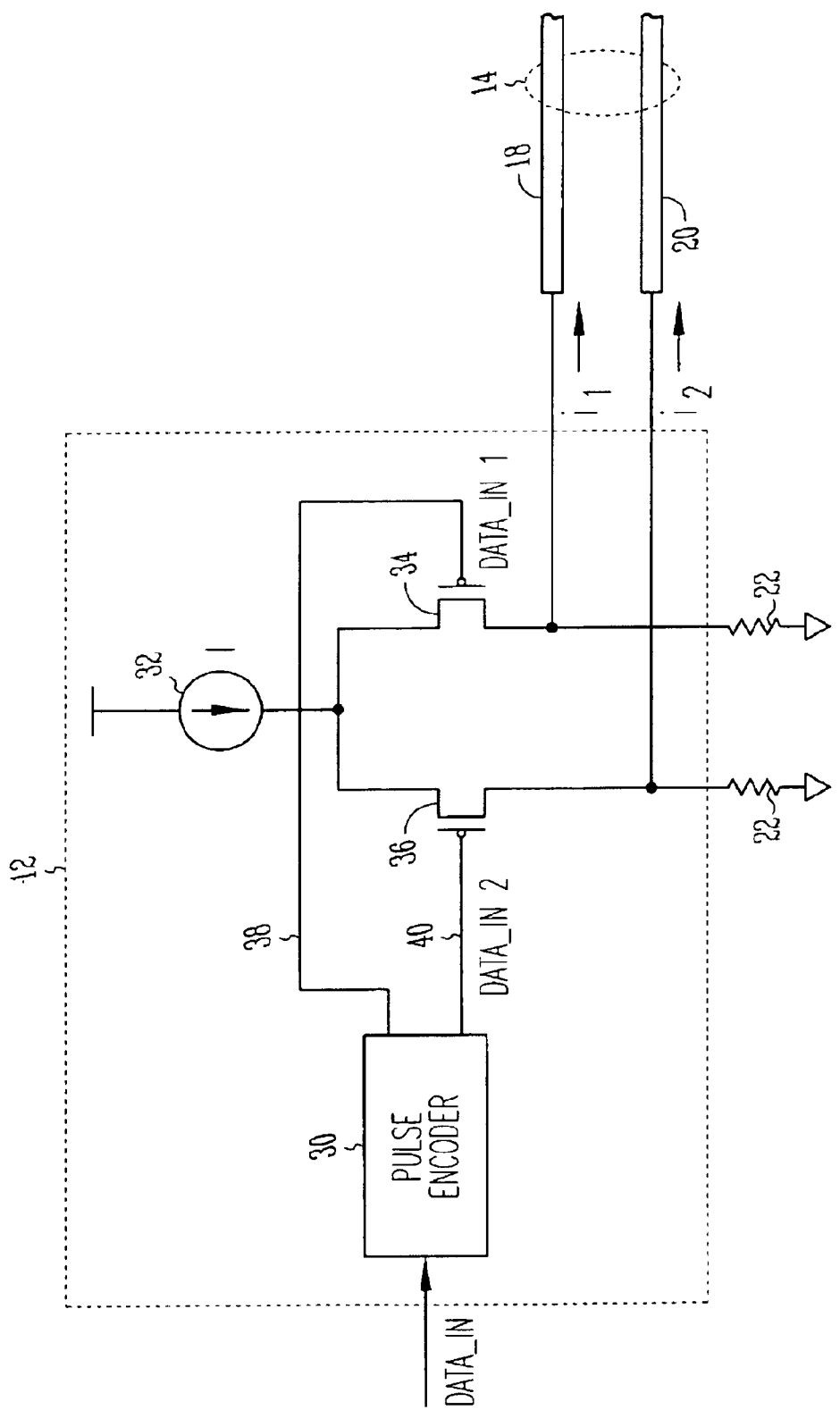
FIG. 2 is a block diagram illustrating a current mode driver that may be used within the interconnect system of FIG. 1 in accordance with an embodiment of the present invention.

FIG. 2 is a block diagram illustrating a current mode driver 12 in accordance with an embodiment of the present invention. As shown, the driver 12 includes a pulse encoder 30, a current source 32, and first and second switches 34, 36. The first and second switches 34, 36 are operative for controllably coupling the current source 32 to the first and second signal conductors 18, 20 of the differential transmission line 14. In this manner, a current-mode signal is transmitted on the differential transmission line 14 by the driver 12. Any form of current source can be used, from relatively simple designs to more complex designs. In at least one embodiment, a cascode current source is used. A single current source 32 can be used by both of the switches 34, 36 (as shown) or a dedicated current source can be provided for each of the switches 34, 36. The pulse encoder 30 receives a data signal at an input thereof and converts the data signal to another signal format. The output signals of the pulse encoder 30 are used to control the switches 34, 36 (i.e., turn them on and off). The input of the pulse encoder 30 can be either single-ended (as shown in FIG. 2) or differential.

As illustrated in FIG. 2, the pulse encoder 30 has first and second outputs 38,40. The first output 38 is connected to a control input of the first switch 34 and the second output 40 is connected to a control input of the second switch 36. In one approach, the pulse encoder 30 generates a pulse at the first output 38 when the input signal of the encoder transitions in one direction (e.g., from a first logic level to a second logic level) and generates a pulse at the second output 40 when the input signal transitions in the opposite direction (e.g., from the second logic level to the first logic level). A pulse on the first output 38 of the pulse encoder 30 will turn on the first switch 34, thus coupling the current source 32 to the first conductor 18 of the differential transmission line 14. This generates a current pulse on the first output conductor 18 that has substantially the same duration as the pulse output by the pulse encoder 30. Similarly, a pulse on the second output 40 of the pulse encoder 30 will turn on the second switch 36, thus coupling the current source 32 to the second output conductor 20. This generates a current pulse on the second output conductor 20 that has substantially the same duration as the pulse output by the pulse encoder 30. In this manner, first and second current signals ($i_1$, $i_2$) are created on the first and second conductors 18, 20 of the differential transmission line 14.

In the illustrated embodiment, the first and second switches 34, 36 are implemented using p-channel metal-oxide-semiconductor (PMOS) field effect transistors (FETs). Thus, the pulses generated by the pulse encoder 30 need to be logic low pulses to appropriately activate the switches 34, 36. It should be appreciated that other types of switches (e.g., n-channel MOSFETs, other forms of insulated gate FETs (IGFETs), junction FETs, bipolar junction transistors, complementary metal-oxide-semiconductor (CMOS) transmission gates, and others) may alternatively be used that may require other control pulse forms to be appropriately activated. In at least one implementation, a binary NRZ to dicode NRZ converter is used as the pulse encoder 30. Methods for implementing such encoders are well known to persons of ordinary skill in the art. Other current mode driver architectures are also possible in accordance with the present invention.

Figure 3:
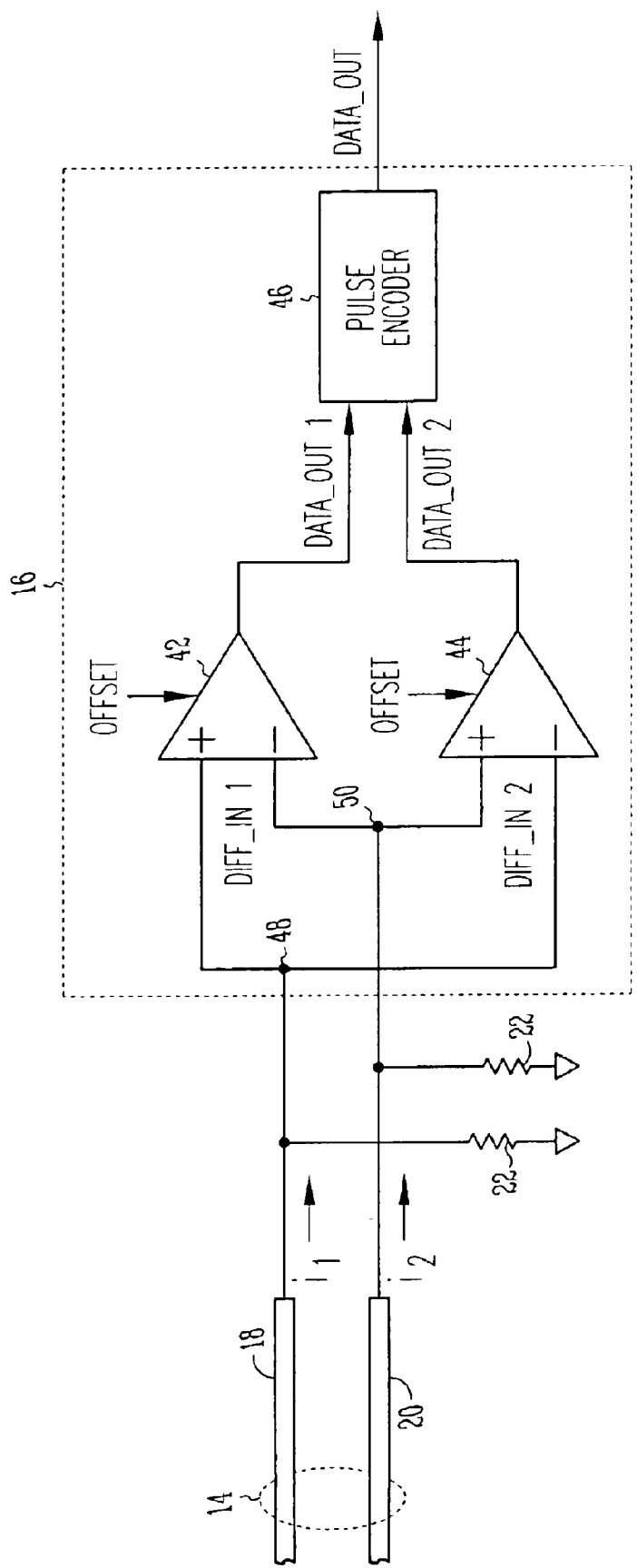
FIG. 3 is a block diagram illustrating a receiver that may be used within the interconnect system of FIG. 1 in accordance with an embodiment of the present invention.

FIG. 3 is a block diagram illustrating a receiver 16 in accordance with an embodiment of the present invention. As shown, the receiver 16 includes first and second comparators 42, 44 and a pulse decoder 46. The first and second current signals ($i_1$, $i_2$) on the first and second conductors 18, 20 of the differential line 14 each flow into respective terminations 22. This forms corresponding voltages on the first and second differential input terminals 48, 50 of the receiver 16. Each of the comparators 42, 44 receives an offset signal that sets a comparison threshold of the comparator. The comparators 42, 44 each compare their differential input signal to the associated comparison threshold and output a first voltage value (e.g., a logic high value) when the magnitude of the input signal exceeds the threshold and a second voltage value (e.g., a logic low value) when the magnitude of the input signal is less than the threshold value. In one approach, the comparison threshold is set to one-half the expected pulse amplitude at the differential input terminals 48, 50.

Each of the comparators 42, 44 has a positive (non-inverting) input and a negative (inverting) input. In the illustrated embodiment, the differential input signal of the second comparator 44 (DIFF_IN 2) is an inverted version of the differential input signal of the first comparator 42 (DIFF_IN 1). This is achieved by connecting the positive input of the first comparator 42 and the negative input of the second comparator 44 to the first differential input terminal 48 of the receiver 16 and the negative input of the first comparator 42 and the positive input of the second comparator 44 to the second differential input terminal 50 of the receiver 16. In addition, the comparison thresholds of the two comparators are equal (i.e., same polarity, same magnitude). In effect, the first comparator 42 will generate the first voltage value (e.g., a logic one) when the differential input signal between the first and second differential input terminals 48, 50 exceeds the threshold value and the second comparator 44 will generate the first voltage value when the differential input signal between the first and second differential input terminals 48, 50 is less than the negative of the threshold value.

The output signals of the first and second comparators 42,44 (DATA_OUT 1, DATA_OUT 2) are delivered to the pulse decoder 46 which converts the data format of the signals to generate an output data signal (DATA_OUT). In at least one approach, the pulse decoder 46 will transition its output from a first signal level to a second signal level in response to the leading edge of each pulse output by the first comparator 42 and will transition its output from the second signal level to the first signal level in response to the leading edge of each pulse output by the second comparator 44. In at least one implementation, a dicode NRZ to binary NRZ converter is used as the pulse decoder 46. Methods for implementing such decoders are well known in the art.

Figure 4:
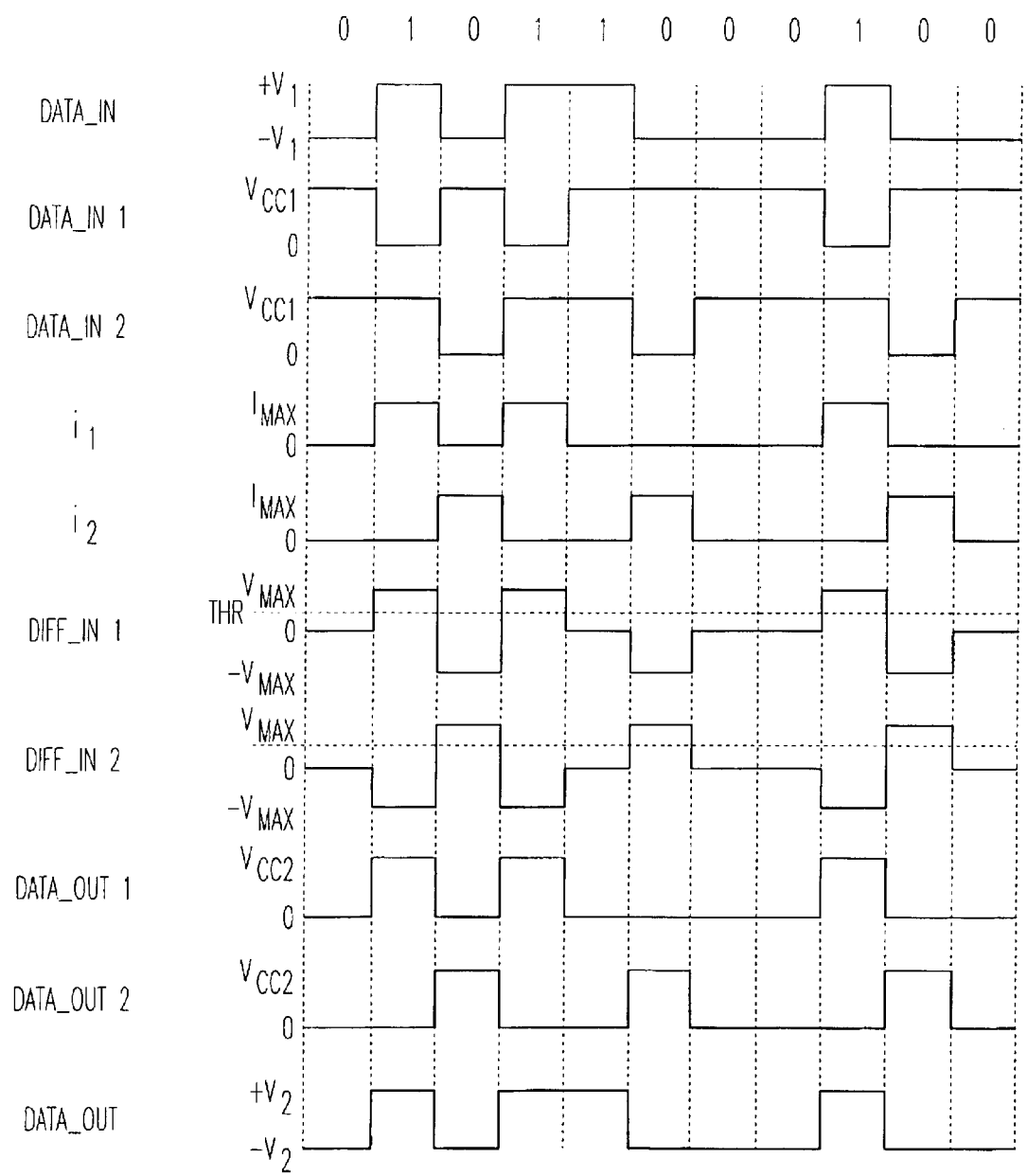
FIG. 4 is a timing diagram illustrating the operation of the driver of FIG. 2 and the receiver of FIG. 3 in accordance with an embodiment of the present invention.

FIG. 4 is a timing diagram illustrating the operation of the driver 12 of FIG. 2 and the receiver 16 of FIG. 3 in accordance with an embodiment of the invention. With reference to FIG. 4, the DATA-IN signal is input into the pulse encoder 30 of FIG. 2. The DATA_IN signal uses a binary NRZ format that represents a "logic zero" using a negative voltage ($-V_1$) and a "logic one" using a positive voltage ($+V_1$). The pulse encoder 30 generates a negative pulse at the first output (see DATA_IN 1 in FIG. 4) for each transition of the input signal from $-V_1$ to $+V_1$. The pulse encoder 30 also generates a negative pulse at the second output (see DATA_IN 2 in FIG. 4) for each transition of the input waveform from $+V_1$ to $-V_1$. This is a form of dicode NRZ encoding. The output pulses generated by the pulse encoder 30 are used to control the first and second switches 34, 36, thus generating corresponding current signals ($i_1$, $i_2$) on the conductors 18, 20 of the differential transmission line 14. At the other end of the differential transmission line 14 (see FIG. 3), the current signals ($i_1$, $i_2$) each flow into a corresponding line termination 22, resulting in voltages on the first and second differential input terminals 48, 50 of the receiver 16.

As shown in FIG. 4, the differential input signals (DIFF_IN 1, DIFF_IN 2) of the first and second comparators 42, 44 are inverted versions of one another. The first and second comparators 42, 44 each output a voltage level of zero when a corresponding input signal is below a threshold value (THR) and a voltage level of $V_{cc2}$ when the corresponding input signal is above the threshold value (see signals DATA_OUT 1 and DATA_OUT 2 in FIG. 4). The output of the pulse decoder 46 (DATA_OUT) transitions from a negative voltage ($-V_2$) to a positive voltage ($+V_2$) in response to the rising edge of each pulse of DATA_OUT 1 and from the positive voltage ($+V_2$) to the negative voltage ($-V_2$) in response to the rising edge of each pulse of DATA_OUT 2. As illustrated, the output signal of the pulse decoder 46 (DATA_OUT) is substantially the same as the input signal of the pulse encoder 30 (DATA_IN), although the voltage values $V_1$ and $V_2$ may be different.

In the interconnect system described above, power is consumed in the driver only when input transitions are present. That is, little or no power is consumed in the driver during periods of low input switching activity. In this manner, the average power consumed by the driver will be reduced considerably in systems that often transmit long strings of "logic ones" and/or "logic zeros." Conversely, in interconnect systems that transmit signals in binary NRZ format, power is continuously consumed by the driver. In addition, the above-described system is heterogeneous, voltage tolerant. This means that the driver and receiver power supply potentials (e.g., $V_{cc1}$ and $V_{cc2}$ in FIG. 4) can be different, as long as the $V_{ss}$ is the same in the driver and receiver.

Figure 5:
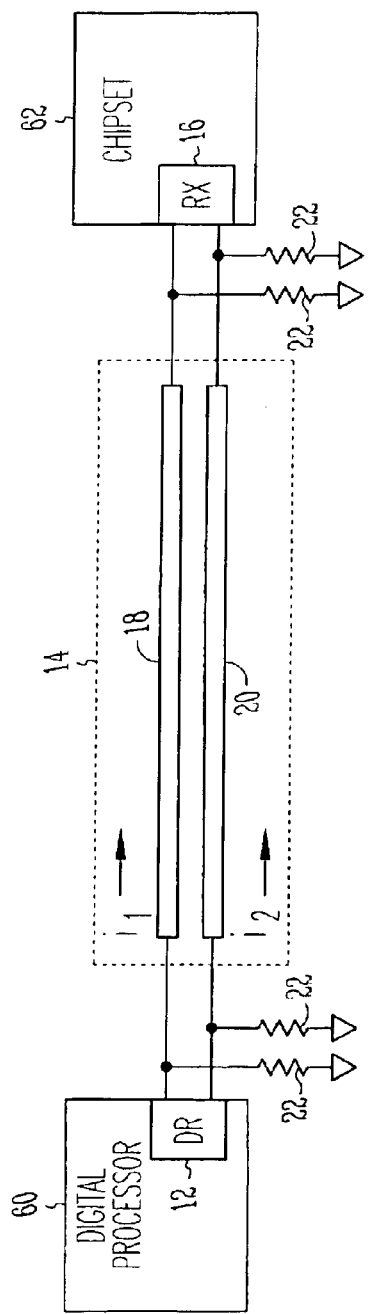
FIG. 5 is a block diagram illustrating an interconnect between a digital processor and a chipset in accordance with an embodiment of the present invention.
Figure 6:
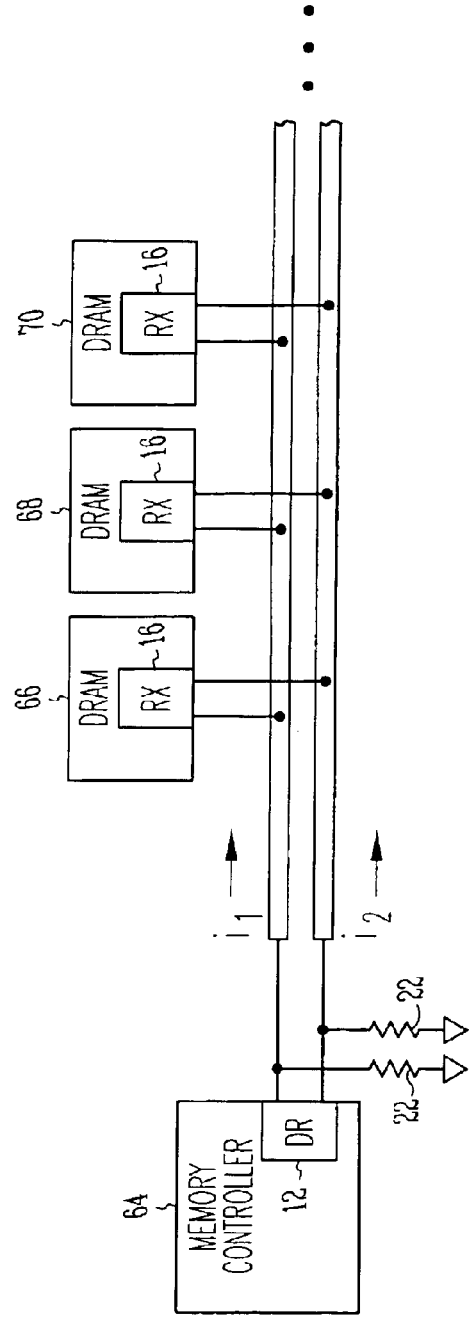
FIG. 6 is a block diagram illustrating an interconnect between a memory controller and a number of DRAM units in accordance with an embodiment of the present invention.

The inventive principles can be used in a wide variety of different applications requiring the transfer of digital information. In one possible application, for example, the inventive principles are used to provide interconnects between functional units within a computer. As illustrated in FIG. 5, in one embodiment, an interconnect is provided between a digital processor 60 (e.g., a general purpose microprocessor, a digital signal processor (DSP), a reduced instruction set computer (RISC), a complex instruction set computer (CISC), a field programmable gate array (FPGA), etc.) and a chipset 62 within a computer system. The digital processor 60 includes a driver 12 (such as the one described previously) that is connected to a differential input/output (I/O) port of the processor 60. Similarly, the chipset 62 includes a receiver 16 that is connected to a differential I/O port thereof. The differential transmission line 14 can be implemented on, for example, a PCB (e.g., a computer mother board). Thus, when the digital processor 60 and the chipset 62 have been mounted on the PCB, the interconnect will be complete. In another application, as illustrated in FIG. 6, the inventive principles are used to provide communication between a memory controller 64 and a number of DRAM units 66, 68, 70 (or other memory elements) within a digital memory device. In yet another application, the inventive principles are used to provide interconnects between server units in a server system. As will be appreciated, many other applications also exist.

Figure 7:
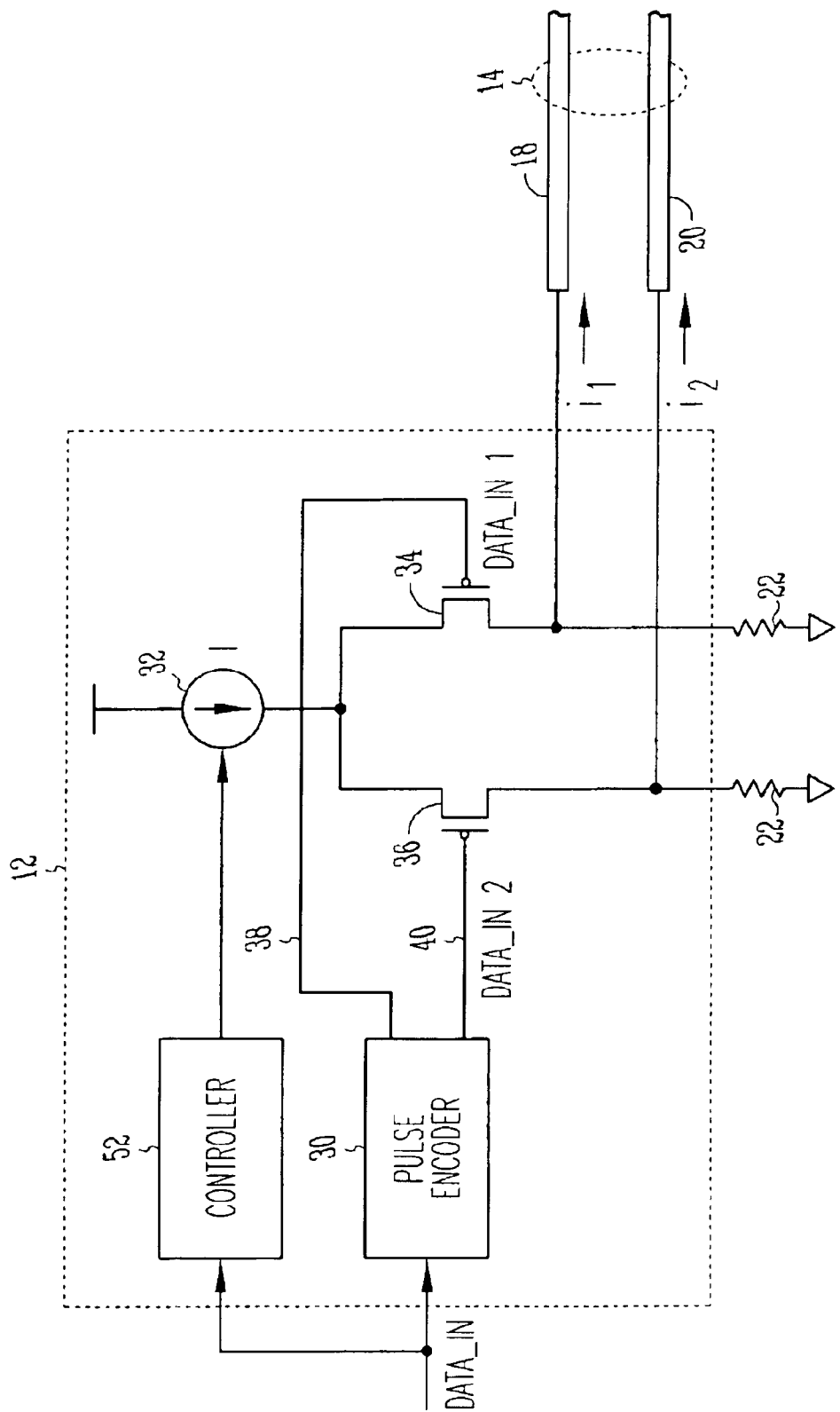
FIG. 7 is a block diagram illustrating a driver that includes functionality for modulating the power level of a transmit signal based on the frequency content of the data stream to be transmitted in accordance with an embodiment of the present invention.

In at least one embodiment of the present invention, the power level of a driver unit is modulated based on the frequency content of the data stream to be transmitted. For example, FIG. 7 is a block diagram illustrating a modified version of driver 12 of FIG. 2 including functionality for performing the power modulation. As illustrated, a controller 52 has been added to the driver 12. The controller 52 receives the input data signal of the pulse encoder 30 and measures the frequency of the signal. In one approach, the controller 52 simply counts the number of transitions in the input data signal and maintains a running average of the transition count over time. Other frequency measurement techniques are also possible. The controller 52 uses the frequency information to control the current level of the current source 32. In one approach, the controller 52 increases the current level of the current source as frequency increases. For example, the controller 52 can cause the current source 32 to operate at a lower current level when the frequency of the input data signal is below a predetermined level and at a higher current level when the frequency is above the predetermined level. One or more intermediate current levels may also be used for intermediate frequencies. Other techniques for modulating the power of the driver 12 are also possible in accordance with the invention.

Figure 8:
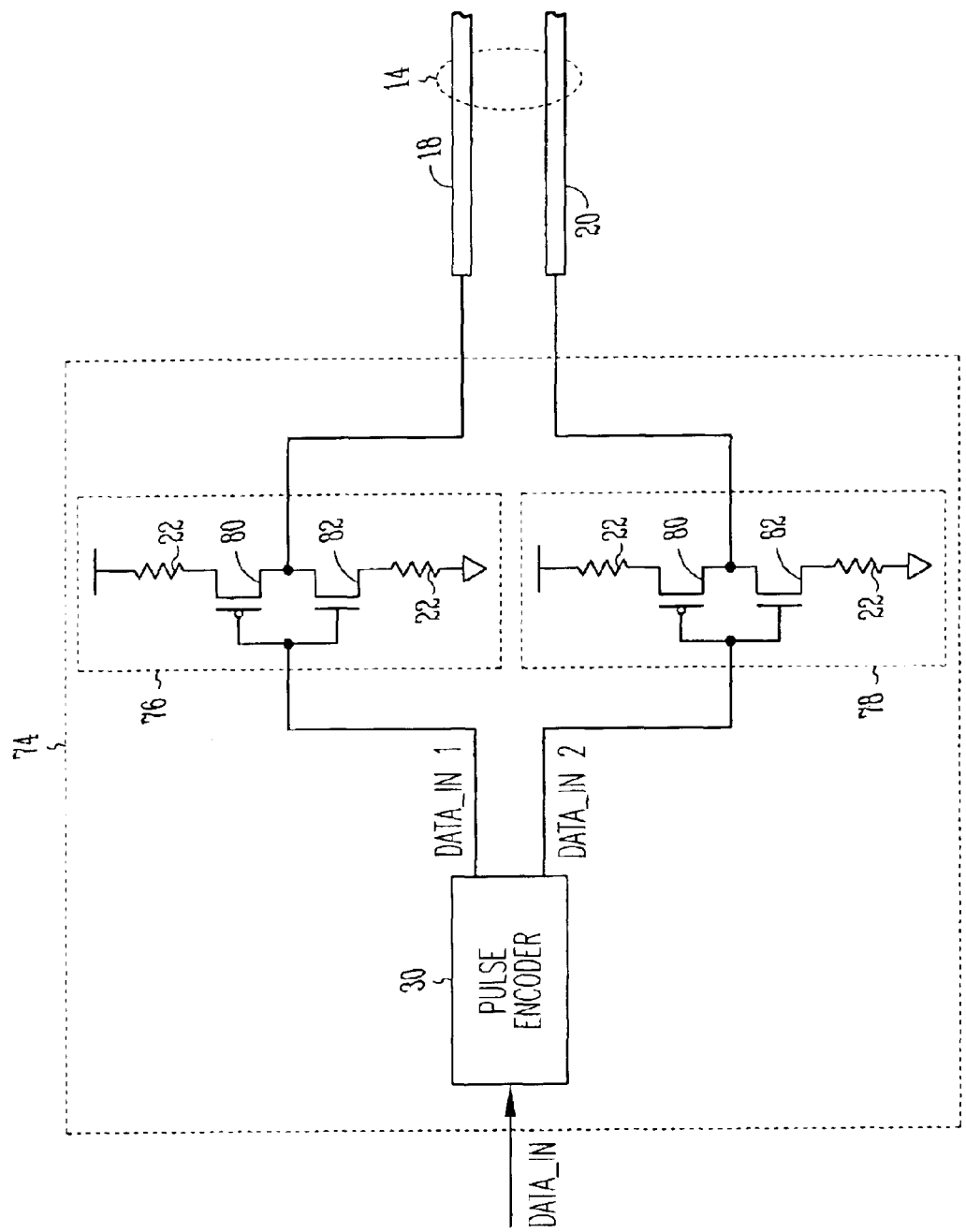
FIG. 8 is a block diagram illustrating a voltage mode driver in accordance with an embodiment of the present invention.

FIG. 8 is a block diagram illustrating a voltage mode driver 74 in accordance with an embodiment of the present invention. The voltage mode driver 74 can be used with the receiver 16 of FIG. 3, for example, to provide a complete interconnect system. As shown, the driver 74 includes a pulse encoder 30 and first and second CMOS inverters 76, 78. The pulse encoder 30 may be the same as the one described previously. The first and second CMOS inverters 76, 78 each include a PMOS device 80 and an NMOS device 82 that are connected in series between a supply terminal (e.g., $V_{cc}$) and ground. A first termination resistor 22 is located between each PMOS device 80 and the corresponding supply terminal and a second termination resistor 22 is located between each NMOS device 82 and ground. Because one of the terminations 22 is always coupled to each of the conductors 18, 20 of the differential transmission line 14, a relatively good match can be maintained at the driver end of the line 14. Using the voltage mode driver 74 of FIG. 8, voltage pulses are transmitted on the first and second conductors 18, 20 of the differential transmission line 14 that are inverted versions of the pulses output by the pulse encoder 30. Other voltage mode driver architectures are also possible in accordance with the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A differential line receiver comprising:
   first and second differential input terminals to receive a differential input signal;
   a first circuit to generate an output pulse when a magnitude of the differential input signal is greater than a first threshold value,
   a second circuit to generate an output pulse when the magnitude of the differential input signal is less than a second threshold value; and
   a pulse decoder having an output that transitions from a first signal level to a second signal level in response to an output pulse of the first circuit and that transitions from the second signal level to the first signal level in response to an output pulse of the second circuit.

2. The differential line receiver of claim 1, wherein:
   said first circuit includes a first comparator having a positive input coupled to said first differential input terminal and a negative input coupled to said second differential input terminal.

3. The differential line receiver of claim 2, wherein:
   said second circuit includes a second comparator having a positive input coupled to said second differential input terminal and a negative input coupled to said first differential input terminal.

4. The differential line receiver of claim 3, wherein:
   said first comparator and said second comparator utilize a common comparison threshold value.

5. The differential line receiver of claim 1, wherein:
   said pulse decoder includes a dicode NRZ to binary NRZ converter.

6. The differential line receiver of claim 1, wherein:
   said output of said pulse decoder transitions from the first signal level to the second signal level in response to a rising edge of the output pulse of the first circuit.

7. A digital interconnect system comprising:

a differential transmission line having first and second signal conductors;

a differential driver to transmit pulses on said differential transmission line in response to an input data signal; and a differential receiver to sense the pulses on the differential transmission line and to generate an output data signal based thereon;

wherein said differential receiver includes:

first and second differential input terminals to receive a differential input signal;

a first circuit to generate an output pulse when a magnitude of the differential input signal is greater than a first threshold value, a second circuit to generate an output pulse when the magnitude of the differential input signal is less than a second threshold value; and a pulse decoder having an output that transitions from a first signal level to a second signal level in response to an output pulse of said first circuit and that transitions from the second signal level to the first signal level in response to an output pulse of said second circuit and wherein said differential driver generates a pulse on the first signal conductor when the input data signal transitions from a first signal level to a second signal level and said differential driver generates a pulse on the second signal conductor when the input data signal transitions from the second signal level to the first signal level.

8. The digital interconnect system of claim 7, wherein:

said differential driver includes a first switch to couple a current source to the first signal conductor when the input data signal transitions from the first signal level to the second signal level and a second switch to couple a current source to the second signal conductor when the input data signal transitions from the second signal level to the first signal level.

9. The digital interconnect system of claim 8, wherein:

said differential driver includes a pulse encoder having a first output coupled to an input terminal of the first switch and a second output coupled to an input terminal of the second switch, said pulse encoder to generate a pulse at the first output when the input signal transitions from the first signal level to the second signal level and to generate a pulse at the second output when the input signal transitions from the second signal level to the first signal level.

10. The digital interconnect system of claim 7, wherein:

said pulse encoder includes a binary NRZ to dicode NRZ converter.

11. The digital interconnect system of claim 7, wherein:

said pulse decoder includes a dicode NRZ to binary NRZ converter.

12. The digital interconnect system of claim 7, comprising:

first and second terminations terminating said first and second signal conductors, respectively, of said differential transmission line at an end of said differential transmission line coupled to said differential receiver.

* * * * *